United States Patent [19]
Trsar et al.

[11] Patent Number: 5,935,187
[45] Date of Patent: *Aug. 10, 1999

[54] ENGINE ANALYZER WITH PATTERN LIBRARY LINKED TO VEHICLE ID AND DISPLAY SCOPE CONFIGURATION

[75] Inventors: Dale A. Trsar, Mt. Prospect; Yosuf M. Taraki, Evanston; Richard H. Shepherd, McHenry; Tyrone J. Moritz, Morton Grove; Mark H. Petersen, Mundelein, all of Ill.

[73] Assignee: Snap-on Technologies, Inc., Lincolnshire, Ill.

[ * ] Notice: This patent is subject to a terminal disclaimer.

[21] Appl. No.: 09/114,001

[22] Filed: Jul. 10, 1998

Related U.S. Application Data

[63] Continuation of application No. 08/631,309, Apr. 10, 1996, Pat. No. 5,852,789.

[51] Int. Cl.[6] ............................................. G06G 7/70
[52] U.S. Cl. ........................ 701/102; 701/101; 701/99; 73/117.3; 345/140; 345/133; 702/67; 702/71; 324/140
[58] Field of Search ................ 701/99, 102, 29, 701/35, 31, 32; 73/116, 117.2, 117.3, 118.1; 324/379, 394, 103 P, 121 R, 384; 345/146, 340, 352; 702/13, 39, 68, 67, 71

[56] References Cited

U.S. PATENT DOCUMENTS

| | | | |
|---|---|---|---|
| 4,128,005 | 12/1978 | Arnston et al. | 73/117.3 |
| 4,394,742 | 7/1983 | Crummer et al. | 701/102 |
| 4,399,407 | 8/1983 | Kling et al. | 701/102 |
| 4,418,388 | 11/1983 | Allgor et al. | 701/99 |
| 4,476,531 | 10/1984 | Marino et al. | 701/99 |
| 4,797,936 | 1/1989 | Nakatsugawa et al. | 702/13 |
| 4,804,921 | 2/1989 | Putrow et al. | 324/394 |
| 4,928,105 | 5/1990 | Langner | 702/39 |
| 5,066,909 | 11/1991 | Firooz | 702/39 |
| 5,081,592 | 1/1992 | Jenq | 702/39 |
| 5,119,315 | 6/1992 | Kemp et al. | 702/39 |
| 5,255,208 | 10/1993 | Thakore et al. | 701/35 |
| 5,258,753 | 11/1993 | Jonker et al. | 345/140 |
| 5,414,635 | 5/1995 | Ohta | 702/13 |
| 5,481,193 | 1/1996 | Mueller et al. | 701/99 |
| 5,491,631 | 2/1996 | Shirane et al. | 701/35 |
| 5,852,789 | 12/1998 | Tsar et al. | 701/102 |

*Primary Examiner*—Jacques H. Louis-Jacques
*Attorney, Agent, or Firm*—Emrich & Dithmar

[57] ABSTRACT

An engine analyzer having a dual-trace digital oscilloscope includes a memory for storing a library of digitized waveform patterns, the patterns being stored together with identifying data for each pattern and lists of groups of patterns respectively corresponding to different vehicles and/or engines. The analyzer includes a user interface for inputting identifying information relating to the vehicle under test, a waveform acquisition module and a central processor for cooperation with the memory and the oscilloscope for acquiring, digitizing and storing an analog input waveform from the vehicle engine and displaying it on a first trace of the scope in accordance with selected display parameters. The system automatically selects a stored list of patterns corresponding to the vehicle under test and then compares the items in that list one at a time with each of a sequence of search criteria, which criteria may include the particular input pickup lead from which the input waveform is acquired and the sweep selected for the display of that waveform, eliminating from the list any library pattern which fails to meet all the search criteria to produce a set of relevant library, patterns which can then be displayed selectively, one-at-time, on the second trace of the scope.

6 Claims, 7 Drawing Sheets

ENGINE ANALYZER WITH PATTERN LIBRARY LINKED TO VEHICLE ID AND DISPLAY SCOPE CONFIGURATION

This is a continuation of application Ser. No. 08/631,309, filed Apr. 10, 1996, now U.S. Pat. No. 5,852,789.

BACKGROUND OF THE INVENTION

1. Field of the Invention

The invention relates to waveform display apparatus in the nature of a digital storage oscilloscope and, in particular, to automotive engine analyzers which utilize such a digital oscilloscope as a display screen.

2. Description of the Prior Art

It is known to provide engine analyzers with screen displays which essentially constitute digital oscilloscopes. In particular it is known to provide dual-trace digital oscilloscope displays in digital engine analyzers for the purpose of analyzing multi-cylinder internal combustion engines of vehicles. Two of the engine waveforms which are commonly displayed on an engine analyzer scope are the primary and secondary ignition voltages which appear, respectively, across the primary and secondary windings of the ignition coil. The primary and secondary waveforms are typically acquired from the engine by means of separate primary and secondary pickup leads. The analyzer also typically has a no. 1 cylinder lead to detect the firing of the no. 1 cylinder, so that the analyzer can identify the cylinders once the firing order of the engine is known. Other leads may be utilized to acquire other types of waveforms generated by the engine. The acquired waveforms are processed, digitized and stored in memory for display on the oscilloscope, in either live or freeze mode.

In addition to displaying actual engine waveforms on the oscilloscope, an engine analyzer can also perform various diagnostic tests on the input signals and generate various types of screen displays of the test results. One such digital engine analyzer is disclosed, for example, in U.S. Pat. No. 5,250,935 to Jonker et al. That analyzer is provided with a user interface in the form of a keyboard including function keys with screen-defined functions for inputting to the system pertinent information regarding the vehicle and/or engine under test and test selection options.

Analysis of the engine-generated signals may also include comparison of the input signals with known or standard criteria or specifications for properly operating engines. For this purpose, some engine analyzers store data bases including pertinent information regarding the vehicle under test. This information may include, for example, the identification of the vehicle, the particular type of engine, as well as selected specifications of the engine. One such analyzer is disclosed in U.S. Pat. No. 4,128,005, and generates diagnostic signals representing the relationship between engine operating parameters and engine specifications. Diagnostic signals are selectively processed according to a test matrix to determine the operating state of each engine component. The diagnostic message then identifies which, if any of the components requires repair or replacement. However, that system simply compares parameter values relative to the engine under test with stored engine specifications, and does not involve analysis of waveform information.

It is also known to provide an engine analyzer with a data base of reference information which includes a library of signal waveform patterns, which may include generic standard or reference patterns, known "good" patterns for a properly operating engine, or known "bad" patterns which typify known specific trouble conditions. In order to compare an input signal waveform pattern with one of the library patterns, the user has had to scroll through the entire library of patterns or, at least, a list of all the patterns in the library to select the pattern or patterns which are most appropriate for the comparison which he wishes to perform. This can be quite time consuming.

SUMMARY OF THE INVENTION

It is a general object of the present invention to provide an improved apparatus and method for comparing input signal waveforms with a library of waveform patterns, which avoids the disadvantages of prior systems and methods while affording additional structural and operating advantages.

An important feature of the invention is the provision of a method for automatically creating from a library of waveform patterns a list of patterns pertinent to a particular analysis.

In connection with the foregoing feature, it is another feature of the invention to provide a method of the type set forth which permits user selection of the patterns from the generated list.

Yet another feature of the invention is the provision of an apparatus for performing the method of the type set forth.

Certain ones of these and other features of the invention are attained by providing apparatus for selecting from a library of digitized waveform patterns a set of patterns meeting predetermined criteria, the apparatus comprising: memory means for storing the library of waveform patterns along with identifying data for each such pattern, switch means for determining the criteria, and processing means coupled to the memory means and to the switch means and operable under stored program control for automatically comparing the identifying data for the patterns in the library with the criteria and selecting a set of those patterns which meet all the criteria.

Further features of the invention are attained by providing apparatus to permit visual comparison of an analog input waveform pattern from a source with a library of digitized waveform patterns, comprising: waveform acquisition means for receiving the analog input waveform and digitizing it to produce digitized input waveform data representative of the analog input waveform, memory means for storing the digitized input waveform data and for storing the library of digitized waveform patterns, a display device having a dual-trace display screen, processing means coupled to the memory means and to the display device and operating under stored program control for displaying the stored input waveform data on a first trace of the display device, and switch means coupled to the processing means for selecting search criteria, the processing means including means for automatically comparing the selected search criteria with the identifying data for the waveform patterns in the library to select a set of library patterns which meet all the criteria, the switch means including means cooperating with the processing means for displaying on a second trace of the display device a selected waveform pattern from the set.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
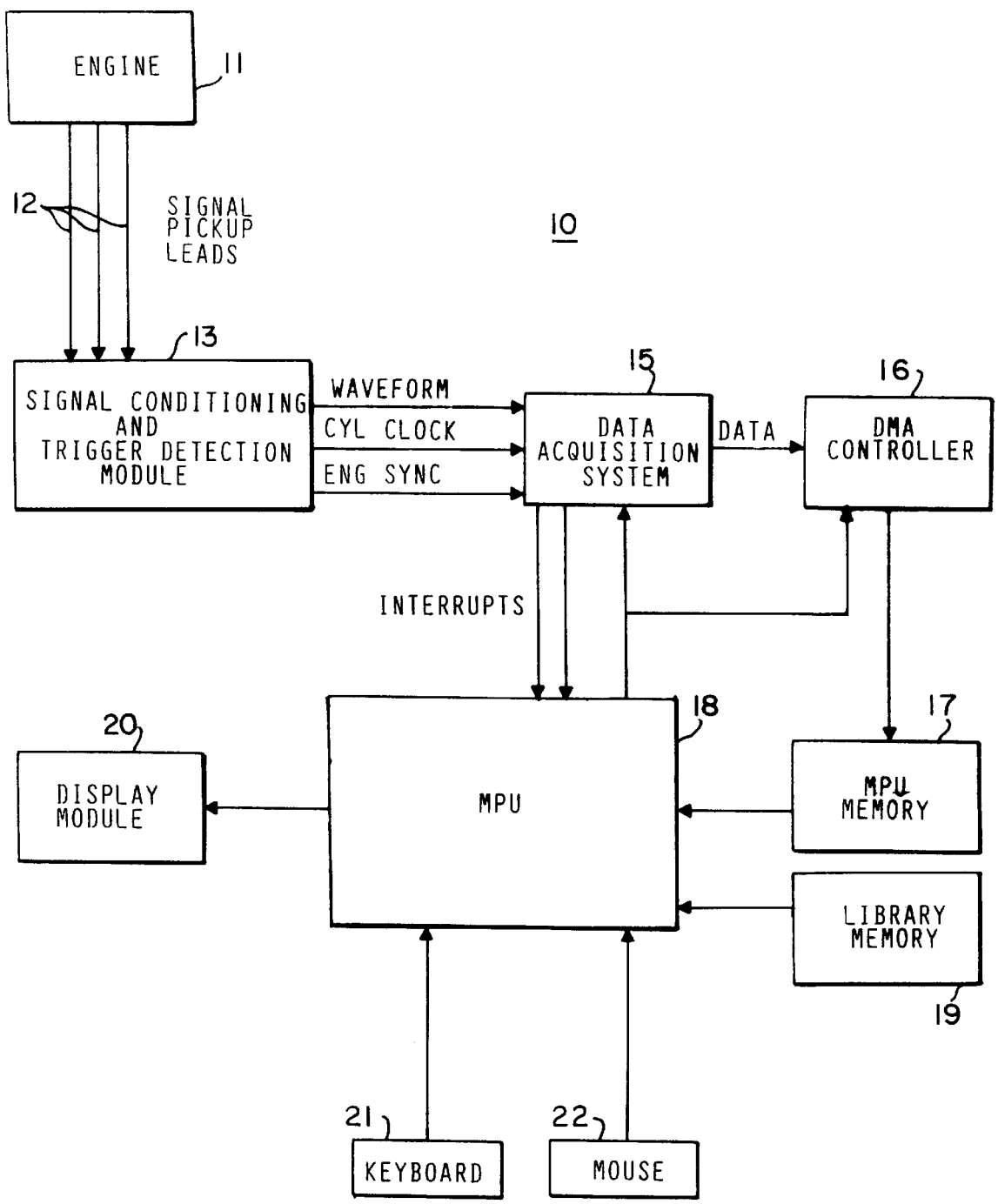
FIG. 1 is a functional block diagram of an engine analyzer system incorporating a digital oscilloscope display in accordance with the present invention.

Referring to FIG. 1, there is illustrated an engine analyzer, generally designated by the numeral 10, in accordance with the present invention. The engine analyzer 10 is adapted for analyzing the operation of an associated multi-cylinder internal combustion engine 11 by, inter alia, monitoring analog waveform signals generated by the engine 11. In this regard, the analyzer 10 is provided with a plurality of signal pickup leads 12 adapted for connection to selected points in the engine 11 for acquiring input signals therefrom. While three such leads have been shown in FIG. 1, this is simply for purposes of illustration, and it will be appreciated that a larger number of leads may be provided. The signal pickup leads 12 preferably include a no. 1 cylinder probe for coupling to the no. 1 cylinder and primary and secondary leads for, respectively, acquiring the voltages on the primary and secondary windings of the ignition coil, all in a known manner. Other auxiliary leads may be provided for acquiring other signals, including non-ignition related signals, which auxiliary leads may include general-purpose voltage pickup probes, which will hereinafter be referred to as "pinpoint" leads.

The signal pickup leads 12 are coupled to a signal conditioning and trigger detection module 13, which performs pre-conditioning operations on the input waveform signals and passes the waveform signals to a data acquisition system 15. The signal conditioning and trigger detection module 13 also generates two digital signals, a cylinder clock signal indicating the firing of each cylinder, and an engine sync signal indicative of the firing of the no. 1 cylinder, which latter signals are also supplied to the data acquisition system 15, which digitizes the analog input waveform signals to produce digitized waveform data. The digitized waveform data is passed to a direct memory access (DMA) controller 16, which controls its storage in a CPU memory 17.

A library memory 19 is also provided to store a library of digitized waveform patterns relating to different types of vehicles and/or engines. In addition to the waveform patterns themselves, the memory 19 includes descriptive data about each pattern in searchable fields. One of these fields is a group number which identifies a particular vehicle, engine or group of vehicles or engines the pattern relates to. Also stored in the memory 19 are lists of patterns which have the same group number. For example, there is a group 1 list of all patterns in group 1, a group 2 list of all patterns in group 2, etc. While the library memory 19 is shown as a separate memory, it will be appreciated that it could be a part of the memory 17.

The analyzer 10 also includes a central processing unit (CPU) 18 which is coupled to each of the data acquisition system 15, the DMA controller 16 and the memories 17 and 19, as well as to a display module 20. The CPU 18 controls the operation of the data acquisition system 15 and the DMA controller 16 and also receives interrupts from the data acquisition system 15, which interrupts may be responsive, inter alia, to the cylinder clock signals. The CPU 18 also controls transfer of stored waveform data from the memories 17 and 19 to the display module 20 for display, and also controls the various operational modes of the display module 20. In this regard, the display module 20 is preferably a color oscilloscope and is operable in live and freeze modes, in single-trace and dual-trace modes, with various sweeps and with various types of triggering. User selection of these and other parameters is effected through an appropriate user interface, which may include a keyboard 21 and/or a mouse 22 which are coupled to the central processing unit 18.

The display module 20 is provided with a plurality of different fixed-time sweeps and the usual cylinder, parade and raster engine sweeps available in prior engine analyzers. In addition, the display module 20 is preferably provided with 5 ms engine sweeps, which are similar to the standard engine sweeps, except that only the first 5 ms of each cylinder is plotted. There are 5 ms engine sweeps corresponding to each of the standard engine sweeps, viz., cylinder 5 ms, parade 5 ms and raster 5 ms.

The engine analyzer 10 supports all of the three standard types of triggering for digital display scopes in engine analyzers, viz., cylinder triggering, automatic triggering and signal triggering. Engine sweeps and 5 ms engine sweeps use cylinder triggering. Fixed-time sweeps use either automatic or signal triggering, as is standard in prior art digital scopes and engine analyzers.

It is an important aspect of the present invention that a user can visually compare on the oscilloscope screen a waveform, either live or frozen, from an engine under test with library waveform patterns pertinent to the test waveform. For this purpose, the analyzer 10 displays the test waveform on a first trace of the display 20 and a selected library pattern on the second trace. A fundamental feature of the invention is that the CPU 18 is programmed to automatically create or "filter" from the library of patterns a set of patterns pertinent to the test waveform displayed on the first trace, and permits the user to select patterns from this filtered set, thereby obviating manual searching through the entire library. This feature will be described in greater detail below with respect to FIGS. 2–7.

Figure 2:
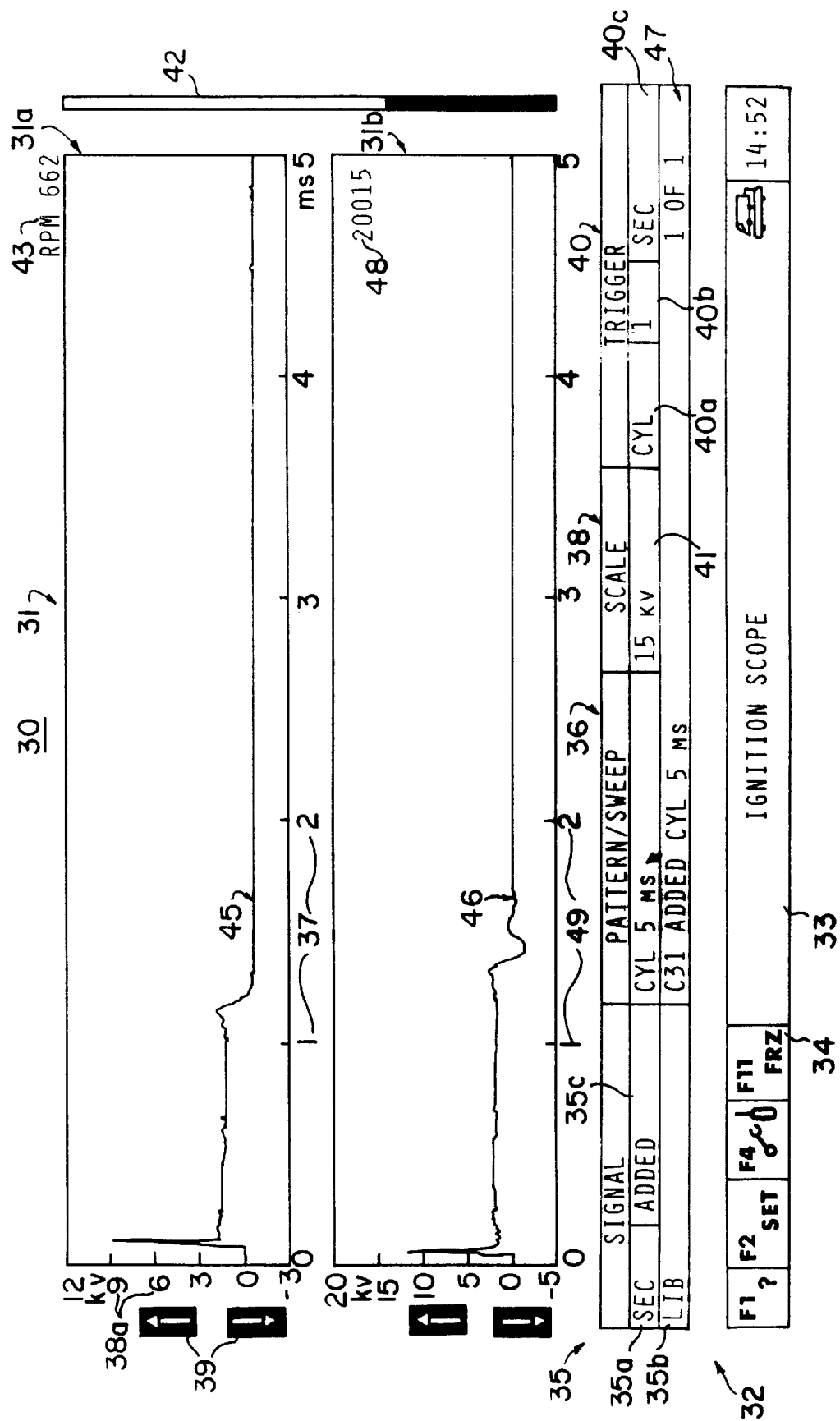
FIGS. 2–4 are screen displays obtainable with the engine analyzer system of FIG. 1.

Referring now to FIG. 2, there is illustrated a screen display 30, which may be displayed on the display module 20, when it is in an operational mode for dual-trace display of waveform data. The screen display 30 has a waveform plot area 31 including a first or upper trace section 31a on which a test waveform can be displayed and a second or lower trace section 31b on which a library waveform can be displayed.

Figure 4:
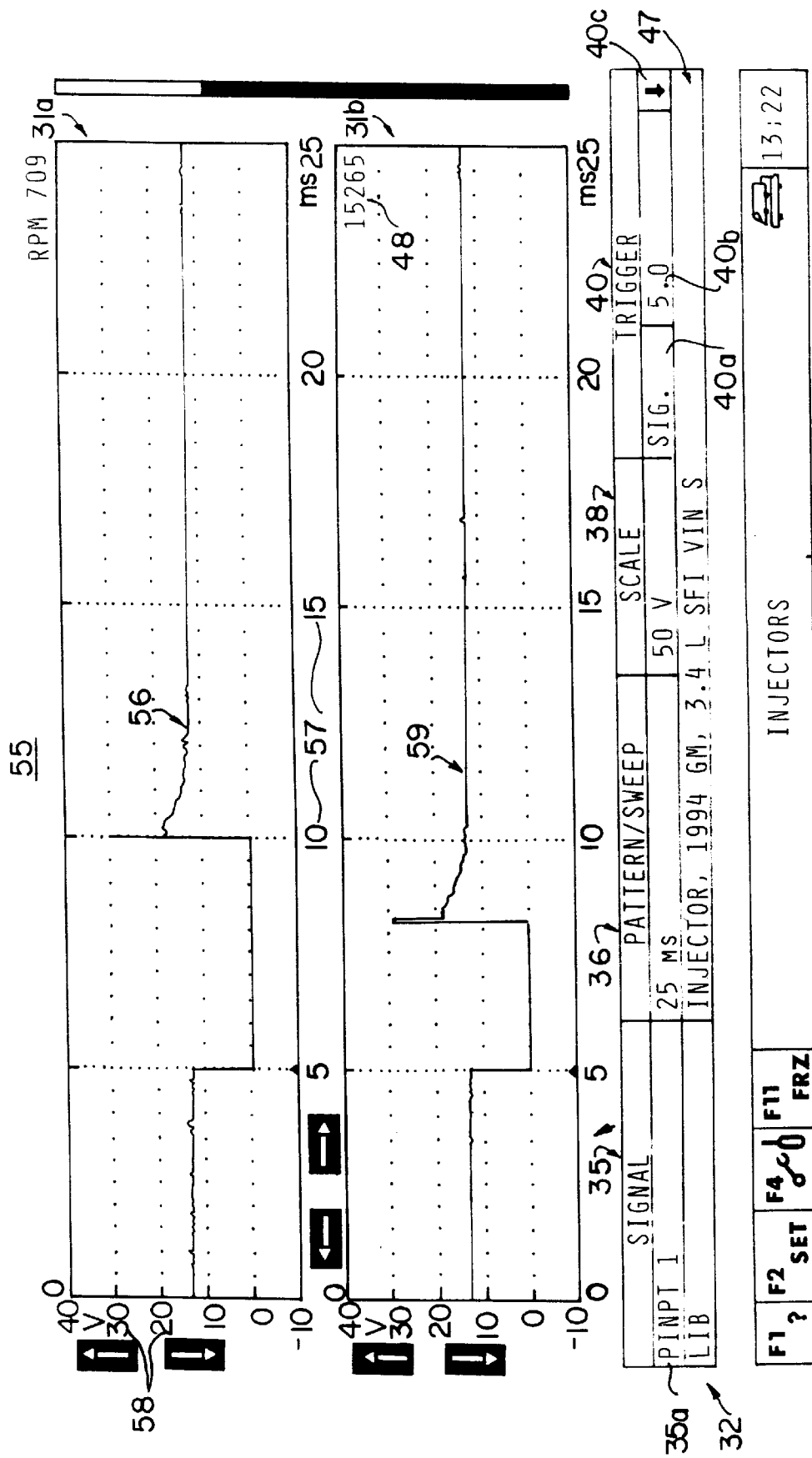

Displayed below the waveform plot area 31 is a control panel area 32, including a number of icons and indicators in the nature of rectangular boxes in which text or other indicia may be displayed, the boxes being arranged in horizontal rows. In the lowermost row is a scope mode indicator 33, which indicates the selected scope mode. In this case the indicated mode is Ignition Scope, which is used for displaying primary and secondary waveforms. An engine sweep is always used in the Ignition Scope mode. Other available modes, which will be discussed below in connection with FIG. 4, are a number of Sensor Test modes for testing selected on-board vehicle sensors.

There is also provided a Freeze icon 34. This icon, when highlighted, selects the freeze display mode. When it is not highlighted, as in FIG. 2, the display is in live mode. In FIG. 2 the icon 34 relates only to the display in the first trace section 31a since, as will be explained below, the second trace section 31b is displaying a library pattern which is frozen.

The control panel area 32 also includes a Signal icon 35, which includes boxes 35a and 35b for respectively indicating the sources of the signals displayed in the two traces of the dual-trace display scope. In each of these boxes, the user can select from among a plurality of different signal source options, with different options respectively corresponding to different ones of the signal pickup leads 12. In this case, the signal displayed on the first trace is the signal appearing on the secondary pickup lead. For the box 35b, one of the available options is "LIB". When this option is selected, as in FIG. 2, the second trace displays one of the library waveform patterns. In FIG. 2 there is an additional signal icon box 35c because the engine under test has a distributorless ignition system (DIS). In DIS systems the secondary signal can have any of three display conditions, viz., "Added", "Power" and "Wasted", the selected mode being indicated in the icon box 35c. In this case, the "Added" mode is selected.

There is also a Pattern/Sweep icon 36 which indicates the selected sweep, in this case a cylinder 5 ms sweep, for the live waveform on the first trace. Time indicia 37 indicating the 5 ms sweep time scale are displayed across the bottom of the trace section 31a in 1 ms. increments.

There is also provided a scale icon 38 which indicates the scale of the trace section 31a along the vertical axis. In this case a 15-kv scale has been selected. Accordingly, scale indicia 38 are arranged in 3-kv increments along the left-hand side of the trace section 31a. In this case, it will be noted that the zero level of the scale is set so that scale goes from −3 kv to +12 kv. The location of this zero level can be selectively changed by use of control arrows 39.

The control panel area 32 also includes a Trigger icon 40, which includes a box 40a for indicating which one of the three types of triggering has been selected. The user can select from among auto, signal and cylinder triggering. When cylinder triggering is selected, as in FIG. 2, the icon 40 also includes a box 40b which indicates the particular cylinder which is being used as the trigger. The icon 40 also includes a box 40c which indicates the particular one of signal pickup leads 12 from which the trigger signal is being acquired, in this case the secondary pickup lead.

Normally, each of the icons 36, 38 and 40 includes vertically arranged boxes respectively corresponding to the two traces of the scope. However, in this case library has been selected for the second trace, and the displayed library pattern will have a fixed sweep and scale. Thus, the boxes corresponding to the second trace are replaced by a library pattern icon 41, which identifies the particular library pattern displayed on the second trace.

The screen display 30 also includes a memory buffer icon 41 in the nature of a narrow, vertical box arranged along the right-hand side of the waveform plot area 31 which, in the live display mode illustrated in FIG. 2, illustrates by the darkened area the portion of the test waveform memory storage buffers which are filled. An RPM indicator 44 is also provided in the upper right-hand corner of the screen indicating the current speed of the engine under test.

A waveform 45 is plotted in the first trace of the waveform plot area 31, in this case the first 5 ms of the secondary signal of the no. 1 cylinder. A library waveform pattern 46 is displayed on the second trace, this pattern being identified in the icon 41 as a secondary waveform for a DIS engine in "added" mode with a cylinder 5 ms sweep. As is explained more fully below, the pattern 46 is selected from a set of library patterns pertinent to the waveform 45 in the first trace, which set is automatically created or "filtered" from the library.

More particularly, there is stored in the library memory 19, along with the library waveform patterns themselves, identifying information with respect to each pattern, stored in searchable fields. One of these fields of identifying information is a group number which indicates a particular group of patterns to which the pattern belongs, with each group corresponding to a particular external source of analog input waveforms. Thus, for example, a group could refer to a particular vehicle, a particular engine, a particular group of engines or vehicles or the like. There are also stored in the library memory 19 lists corresponding to the several groups of patterns, with each list listing all of the patterns in that group. Before conducting a test with the analyzer 10, the user will input an identification of the source being tested, e.g., the vehicle identification, using the keyboard 21 and/or the mouse 22, this information being stored in the memory 17.

As will be explained below, the operating program of the CPU 18, utilizing user-input information regarding the source vehicle and/or engine, first selects the appropriate list of library patterns and then compares the identifying data in that list with a number of predetermined search criteria which correspond to the particular input waveform 45 which is being displayed on the first trace of the display module 20, eliminating from the list those patterns which do not meet all the criteria. There results a set of library patterns which are particularly relevant to the waveform 45 being displayed on the first trace. The first waveform in that set, in this case the waveform 46, will then be displayed in the second trace of the screen display. This is indicated by indicia 47 at the right-hand end of the library pattern icon 41 which, in FIG. 2, is "1 of 1". The second number indicates the number of patterns in the set which has been selected or filtered from the library, in this case only one, and the first number is the number of the pattern in that set which is currently being displayed in the second trace. The first pattern is displayed by default initially, and the user can then select other patterns from the set by use of the keyboard 21 or the mouse 22. There is also displayed in the upper right-hand corner of the first trace section 31b an indicium 48 which is the identification number of the particular library pattern being displayed. As can be seen in FIG. 2, this will typically be a pattern which corresponds very closely to the pattern in the first trace, and will typically have the same sweep scale, the second trace having sweep time indicia 49 corresponding to the indicia 37 in the first trace. The user can then visually compare the test waveform on the first trace with the library waveform pattern on the second trace.

In general, each of the several icons in the control panel area 32 represents a switch, which can be operated by the user by means of either the keyboard 21 or the mouse 22. For the icons 35, 36, 38 and 40 the icon box with respect to which a selection is to be made is first activated or emphasized, emphasis being indicated by a thickened or brightened border around the box. Thus, in FIG. 2 the Pattern/Sweep icon 36 is emphasized. With the keyboard 21, the arrow keys are used to shift the emphasis to the appropriate box and then the "+" and "−" keys are used to index forwardly and rearwardly through the selections within the emphasized box. With the mouse 22, the mouse cursor is placed on a non-activated box and the mouse is clicked to activate and emphasize the box. Then, each subsequent click of the mouse indexes forward one option through the options associated with the emphasized box.

Figure 3:
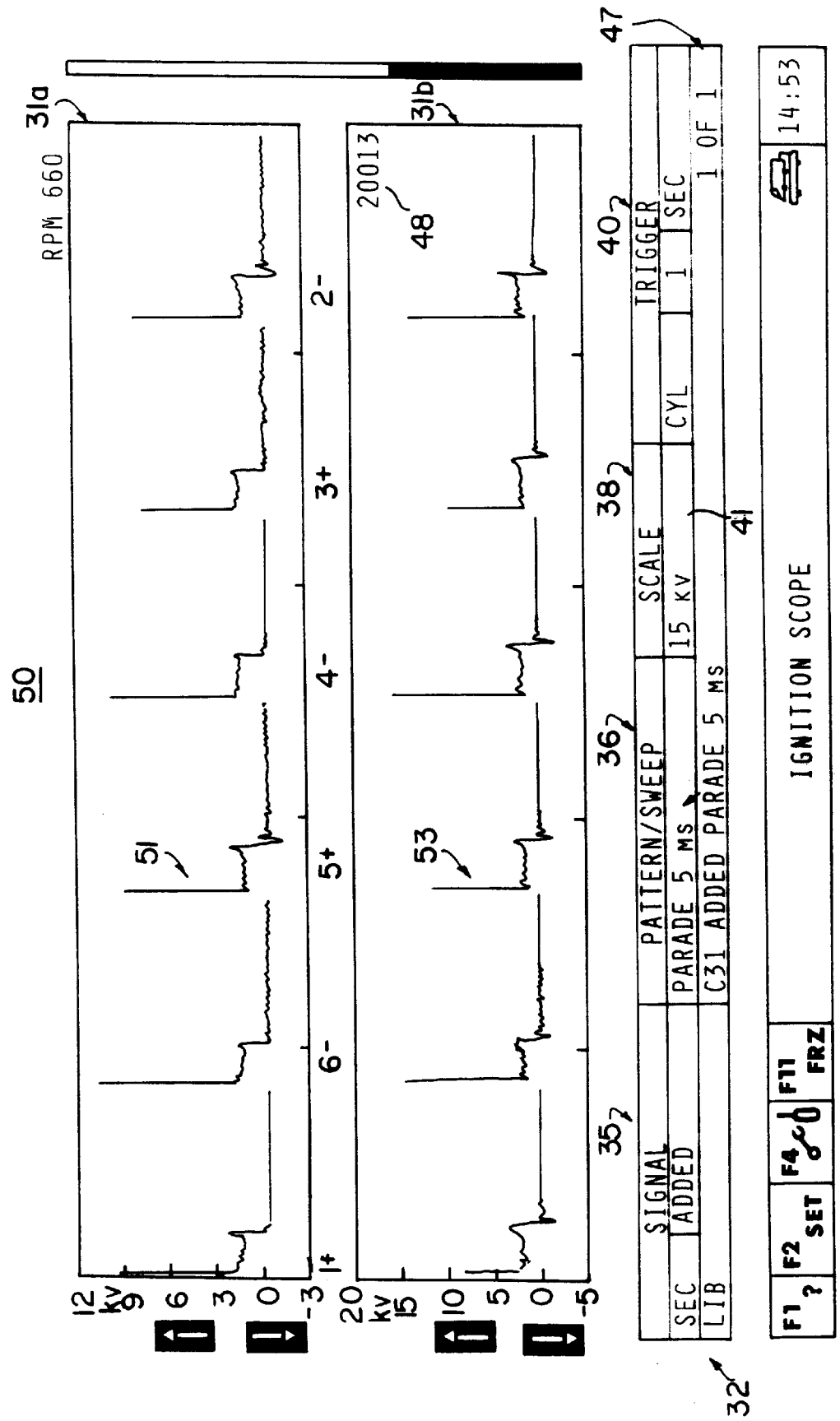

Referring now to FIG. 3, there is illustrated a screen display 50 which is similar to the screen display 30 of FIG. 2, except that, in this case, a waveform 51 is displayed on the first trace, which is the same signal as was shown in FIG. 2, except it is shown with a parade 5 ms sweep, as is indicated in the Pattern/Sweep icon 36. Thus, the first 5 ms of each of the six cylinders of an engine cycle of the secondary signal are displayed and the cylinder numbers are indicated at 52 beneath the trace section 31b, with the cylinders being displayed in the actual firing order of the engine. The "+" and "−" indications next to the cylinder numbers are used only for DIS ignitions and indicate the polarity of the spark on the power stroke for the cylinder.

Again, the system has selected from the library a set of pertinent library patterns which includes only one pattern as indicated by the indicia 47, this pattern being displayed on the second trace at 53, and its identification number being indicated at 48.

Referring now to FIG. 4, there is illustrated a screen display 55 of the type which would be used when the analyzer 10 is operating in a sensor test mode. The particular sensor test being run is indicated in the scope mode indicator 33, in this case the injectors of the vehicle under test. The waveform being generated by the injectors is displayed at 56 in the first trace of the screen and, as is indicated by the signal icon box 35a, this signal is being derived from the first pinpoint lead, and it is being displayed with a 25 ms fixed-time sweep, as indicated by the pattern/sweep icon 36, in a 50-volt scale, as indicated by the scale icon 38. The appropriate sweep time indicia and voltage scale indicia are indicated, respectively, at 57 and 58. In this case, the analyzer has again selected a set of one pertinent waveform pattern from the library, as indicated at 47, this pattern being displayed on the second trace at 59, and its identification being shown in the library pattern icon 41, with its identification number being indicated at 48.

In the screen display of FIG. 4, since the test waveform 56 is being derived from a pinpoint lead, signal triggering is used, as indicated in the icon box 40a. Accordingly, the relative sizes of the icon boxes 40b and 40c have been changed, the box 40b indicating the threshold voltage level at which the signal triggering occurs, in this case 5 volts, and box 40c indicating by a down arrow that triggering is effected on a falling slope of waveform.

In each of FIGS. 2–4, the first trace has been illustrated as operating in live mode, but it will be appreciated that the freeze mode could also be used. Also, it will be appreciated that if the display parameters for the waveform on the first trace are changed while the second trace is in the library signal mode, the analyzer will select a new set of patterns for display corresponding to the new display parameters of the first trace.

As can be seen in FIGS. 2–4, the screen displays include a number of other icons, indicators and other types of indicia which are not described herein, since they are not pertinent to the invention.

Figure 5:
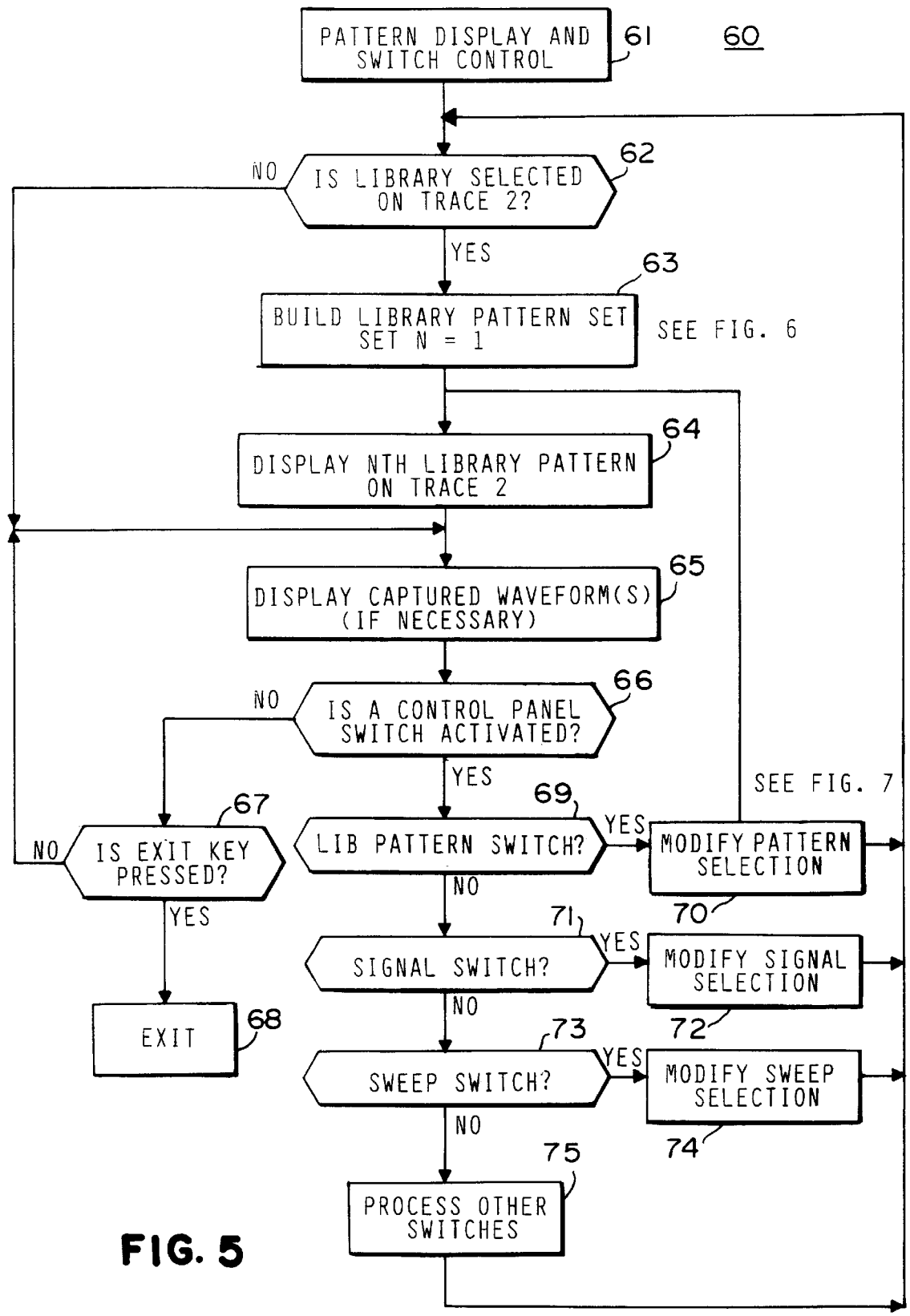
FIG. 5 is a flow chart diagram of a software program of the engine analyzer of FIG. 1 for controlling the display of patterns from a pattern library.
Figure 6:
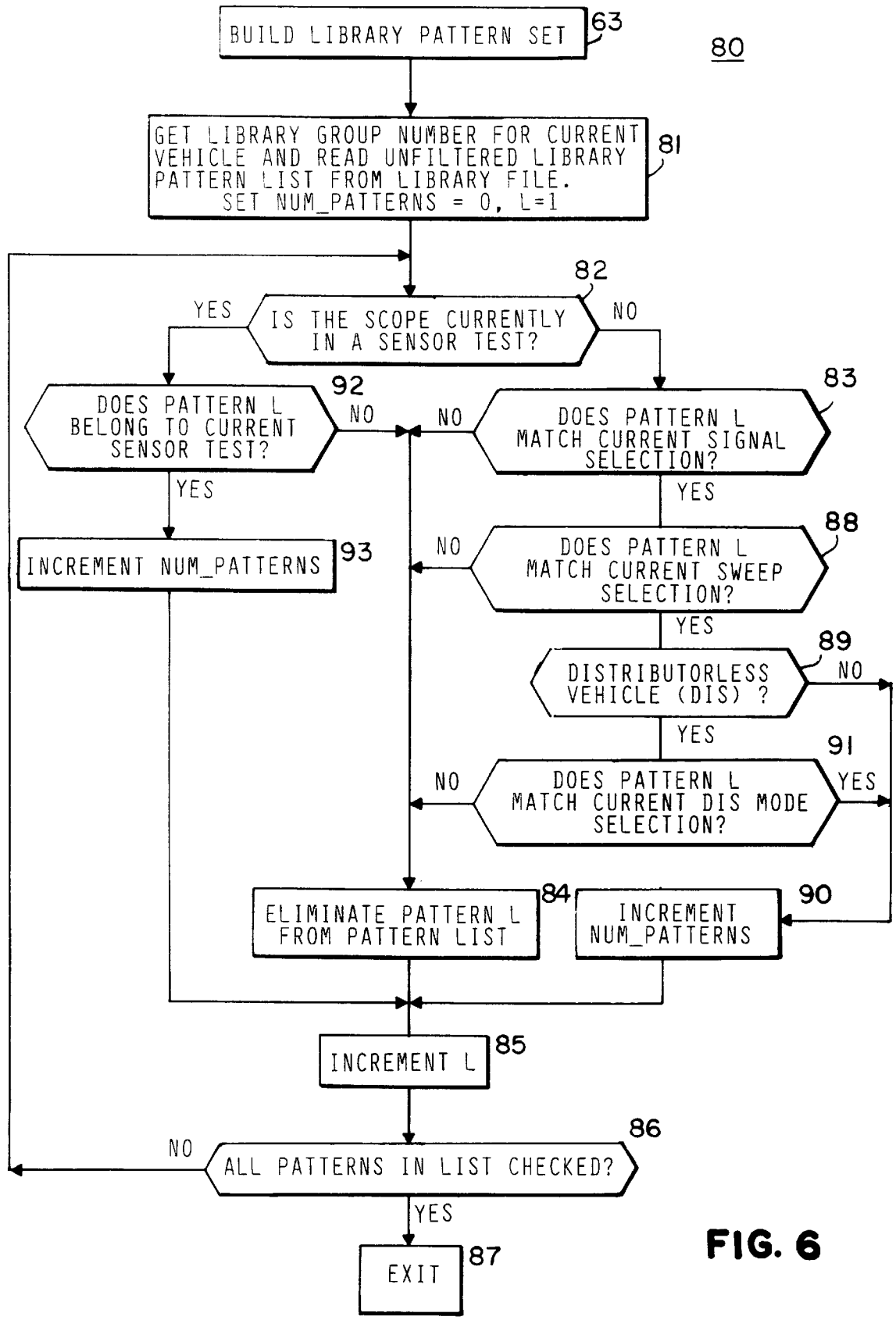
FIG. 6 is a flow chart diagram of a process control subroutine of the program of FIG. 5.
Figure 7:
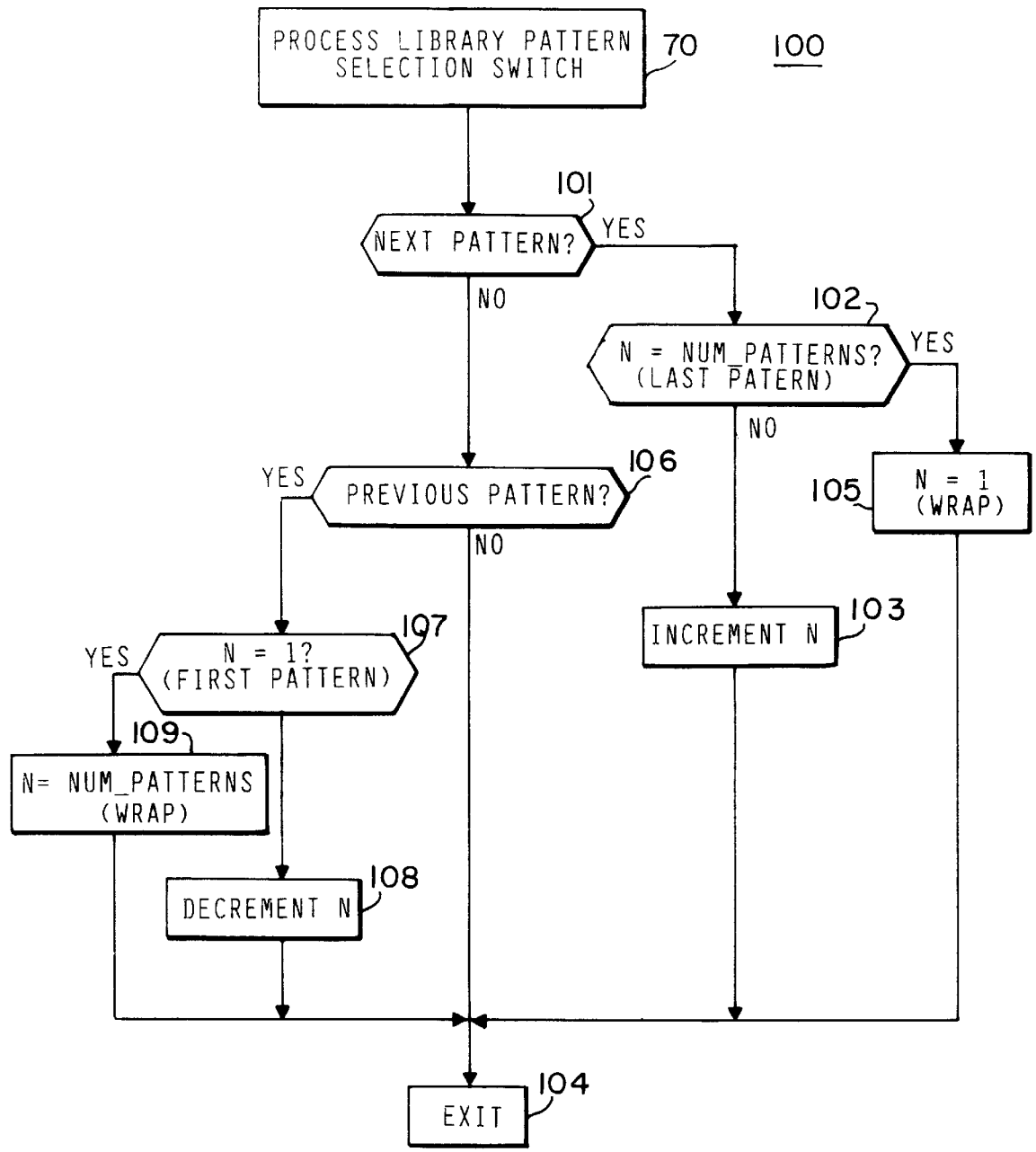
FIG. 7 is a flow chart diagram of another subroutine of the program of FIG. 5.

Referring now to FIGS. 5–7, the operation of the analyzer 10 in selecting a set of patterns for display will be described in greater detail. In FIG. 5, there is illustrated a flow diagram 60 indicating the main routine for the library pattern display and switch control functions. The routine is entered at 61 and then, at 62, the program checks to see if the library signal has been selected in the signal icon 35 for trace 2. If it has, the program at 63 proceeds to build a library pattern set, and sets the number N to one. The subroutine by which the library pattern set is developed is set forth in FIG. 6, which will be described more fully below. The program then at 64 displays the Nth library pattern on the second trace of the screen, i.e., the first pattern in the set, since N has been initially set to 1. The program then at 65 displays on trace 1 a captured waveform, if there is such a waveform for display, and then checks at 66 to see if a control panel switch has been activated. If it has not, the program checks at 67 to see if the EXIT key has been pressed. If so, the program is exited at 68 and, if not, the program returns to block 65. If, at 62, the library signal had not been selected, the program will skip to block 65 without creating a pattern set from the library.

If a control panel switch has been activated at 66, the program checks at 69 to see if it is the library pattern switch corresponding to the library icon 41. If so, the program proceeds at 70 to modify the pattern selection to change the number in accordance with a subroutine which will be described more fully below in connection with FIG. 7, and then returns to block 64 to display the new Nth pattern on the second trace. If, at 69, the library pattern switch was not selected, the program checks at 71 to see if it was the signal icon switch. If so, the program modifies the signal selection at 72 and then returns to decision 62. If the signal switch was not selected, the program checks at 73 to see if it was the pattern/sweep switch. If so, the sweep selection is modified at 74 and the program then returns to decision 62. If the sweep switch was not selected, the program processes the other control panel switches at 75 and then returns to decision 62 to renew the main loop of the program.

Referring now to FIG. 6, there is illustrated a subroutine 80 for building or selecting the library pattern set, this routine being entered at 63 from the main routine 60, described above in connection with FIG. 5. At 81, the program gets the library group number for the current vehicle and/or engine and reads the unfiltered library pattern list corresponding to that group number from the library file, and then establishes the number of patterns in the set as zero, and sets the number L=1, corresponding to the first pattern in the group list. Next, the program checks at 82 to see if the scope is currently in a test sensor mode. If it is not, as in FIG. 2, the program checks at 83 to see if the pattern L matches the current selection on the signal icon 35. If it does not, the program eliminates that pattern from the group list at 84, then increments the number L at 85 to move to the next pattern in the group and checks at 86 to see of all patterns in the group list have been checked. If they have, the program is exited at 87 to return to the main loop 64 in FIG. 5. If all patterns have not been checked, the program returns to decision 82 to renew the loop.

If, at 83, the pattern L matched the current signal icon selection, the program checks at 88 to see if it matches the current selection of the sweep icon 36, if not, the program again eliminates that pattern, increments the number L and reenters the loop. If a match is found at 88, the program checks at 89 to see if the vehicle is a DIS vehicle. If not then pertinent criteria have been met and the program moves at 90 to increment the number of patterns in the set to add this pattern to the pertinent set, then moves to 85 to increment to the next pattern in the group list and again reenters the loop at 82. If, at 89, the vehicle is a DIS vehicle, the program checks at 91 to see if the pattern matches one additional criterion, viz., the DIS mode selection, icon box 35c. If not, the program proceeds as before to eliminate that pattern from the group list and, if so, it increases the number of patterns in the set at 90 and proceeds as before.

If, at decision 82, the scope is currently in a sensor test, the program checks at 92 to see if the pattern L belongs to the current sensor test. If it does not, it is eliminated at 84 and the program reenters the loop at 82. If the pattern belongs to the current sensor test, the program at 93 increments the number of patterns in the pertinent set and moves to block 85 to increment to the next pattern in the group list. The program continues in this manner until all patterns in the group list have been checked against all the pertinent criteria, and the pertinent set of patterns constitutes all those patterns from the original group list which have not been eliminated.

Referring now to FIG. 7, there is illustrated the subroutine 100 for processing the pattern selection switch. This routine is entered at 70 from the main routine 60 of FIG. 5, as explained above. The routine first checks at 101 to check to see if the switch has been actuated forward, i.e., to the next pattern in the set. If it has, the program checks at 102 to see if the currently-displayed pattern number corresponds to the last number in the set. If not, the program increments to the next pattern number at 103 and then exits at 104 to return to the main routine at block 64 of FIG. 5. If the currently-displayed pattern number is the last in the set, the program at 105 wraps back to the first pattern in the set.

If, at 101, the switch selection was not moved forward, the program checks at 106 to see if it has moved backward to the previous pattern in the set. If not, the program exits immediately at 104. If so, the program checks 107 to see if the currently-displayed pattern is the first in the set. If not, the program decrements to the next preceding number in the set at 108. If the first pattern in the set is currently displayed, the program wraps at 109 back to the highest number in the set before exiting.

From the foregoing, it can be seen that there has been provided an improved engine analyzer system which permits on-screen comparison of an input analog waveform with pertinent library waveform patterns by automatically selecting from the library a set of pertinent patterns based upon predetermined selection criteria, then permitting the user to selectively display patterns from the pertinent set on one trace of a dual-trace display, while the input waveform is displayed on the other trace.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. In a system for analyzing a device under test, apparatus for selecting from a library of a plurality of pre-programmed digitized waveform patterns not acquired from the device under test a set of patterns meeting predetermined criteria, said apparatus comprising:

a memory simultaneously storing the library of pre-programmed waveform patterns along with identifying data for each such pattern, a user-operable switch for selective determining of the criteria, and a processor coupled to the memory and to the switch and operable under stored program control for automatically comparing the identifying data for the patterns in the library with the criteria and selecting a set of those patterns which meet all the criteria.

2. The apparatus of claim 1, and further comprising a display coupled to said processor for displaying a pattern from the set.

3. The apparatus of claim 2, wherein said switch includes means for selecting a pattern from the set for display.

4. The apparatus of claim 1, wherein said processor includes means for comparing identifying data for the patterns in the library with each criterion in sequence, one pattern at a time.

5. The apparatus of claim 1, wherein the identifying data includes a human-readable textual description for each library pattern, said processor including means for displaying the textual description with its associated library pattern whenever the pattern is displayed.

6. In an analysis apparatus including waveform acquisition circuitry for receiving an analog input waveform from a source and digitizing it to produce digitized input waveform data representative of the analog input waveform, a memory coupled to the waveform acquisition circuitry for storing the digitized input waveform data and for storing a pre-programmed library of digitized waveform patterns not acquired from the source along with identifying data for each such pattern, and a processor coupled to the memory and to the data acquisition circuitry, the improvement comprising:

a user-operable switch coupled to the processor, and a computer program routine executed by the processor including:

(a) a first portion responsive to operation of the switch for determining criteria for the selection of library patterns; and (b) a second portion for automatically comparing the identifying data for the patterns in the library with the criteria and selecting a set of those patterns which meet all the criteria.

* * * * *